United States Patent [19]

Selby, III

[11] Patent Number: 5,127,318
[45] Date of Patent: Jul. 7, 1992

[54] APPARATUS AND PROCESS FOR EXTRACTING ESPRESSO COFFEE

[75] Inventor: Howard W. Selby, III, Boulder, Colo.

[73] Assignee: Selsys Corporation, Boulder, Colo.

[21] Appl. No.: 519,630

[22] Filed: May 7, 1990

Related U.S. Application Data

[63] Continuation-in-part of Ser. No. 283,243, Dec. 12, 1988, abandoned.

[51] Int. Cl.$^5$ ............................................. A47J 31/24
[52] U.S. Cl. ..................................... 99/295; 99/299
[58] Field of Search ................. 99/279, 295, 299, 300, 99/301, 302 R, 302 P, 304, 305, 306, 307, 280, 282, 283, 293; 426/433

[56] References Cited

U.S. PATENT DOCUMENTS

| | | | |
|---|---|---|---|
| 4,136,202 | 1/1979 | Favre | 99/295 |
| 4,667,587 | 5/1987 | Wunder | 99/295 |
| 4,806,375 | 2/1989 | Favre | 99/295 |
| 4,843,955 | 7/1989 | Henn | 99/299 |
| 4,882,982 | 11/1989 | Muttoni | 99/295 |

OTHER PUBLICATIONS

"Espresso: a jewel of flavor", Jan. 1989 *Tea & Coffee Trade Journal*, pp. 30–34, by Shea Sturdivant.
"Physico-Chemical and Structural Characterisation of Espresso Coffee Brew"—XIII colloque ASIC: PAIPA (Colombia) Aug. 21–25 1989-p., 15 FIG., 5 tab. 16 ref.

*Primary Examiner*—Robert W. Jenkins
*Attorney, Agent, or Firm*—Earl C. Hancock; Francis A. Sirr

[57] ABSTRACT

An improved process and apparatus for the extraction of espresso coffee from ground coffee beans in which the pressure of extraction is precisely regulated by a pressure valve and is not dependent on coffee grind size, degree of compaction of the coffee grind, or operator skill. A feature of the invention is in an assembly of the brewing chamber and regulator valve for convenient removal and attachment to an espresso machine as a unit without otherwise modifying the machine. The assembly is configurable with the regulator valve within a common housing which also defines the brewing chamber, or with a regulator valve separate from the brewing chamber assembly but attached to an outlet of the brewing chamber.

17 Claims, 6 Drawing Sheets

APPARATUS AND PROCESS FOR EXTRACTING ESPRESSO COFFEE

BACKGROUND OF THE INVENTION

Related Application

This is a continuation-in-part of copending Pat. application Ser. No. 07/283,243 filed Dec. 12, 1988, now abandoned, entitled IMPROVED PROCESS FOR EXTRACTING ESPRESSO COFFEE by HOWARD W. SELBY, III.

Field of Invention

This invention relates generally to methods and devices for producing espresso coffee. More particularly, the present invention relates to methods and apparatus for consistently producing high quality espresso coffee from ground coffee beans in a manner that is relatively independent of the skill of the espresso machine operator.

Description of Prior Art

Espresso coffee is brewed by forcing hot water through finely ground coffee beans under high pressure which extracts the coffee beverage from the coffee beans. Both the amount of ground coffee beans and water are volumetrically measured. In conventional espresso machines, the coffee beans are finely ground, volumetrically measured and carefully packed manually in a filter device. The filter is thereafter attached to the espresso machine.

That is, a conventional espresso coffee machine typically employs from 5 to 8 grams per cup of ground coffee compacted in a device having a filter basket which device is subsequently attached to the espresso machine. Between 25 to 60 ml/cup of heated water is forced through the ground coffee in the filter over a time period range of 15 to 35 seconds. The compacted coffee in the filter acts as a restriction to the water flow, resulting in a buildup of water pressure within the filter so that water flows under pressure through the coffee and out an exit hole at the base of the filter.

Coffee brewing or extraction occurs as the water passes through the compacted coffee. Extraction pressure is a function of the fineness of the coffee grind and the degree to which it is compacted in the filter. Both of these are operator dependent resulting in quality variations in the extracted coffee based on the experience and skill of the operator.

Hot water is forced through the filter by means of a pump which is operated by hand or by means of an electric pump device. The hot water is forced into the ground coffee beans in the filter. The fineness of the coffee grind and the degree of compaction thereof by the machine operator creates a pressure differential across the ground coffee beans. This pressure differential varies across the ground coffee beans from the highest on the inlet or upstream side of the ground coffee beans to the lowest on the outlet or downstream side. Because of the pressure gradient, not all of the ground coffee beans are subjected to the optimum extraction pressure resulting in extraction inefficiencies which require use of larger volumes of ground coffee beans.

The water, under pressure, is forced through the coffee beans and extracts the coffee from the beans. Extraction time is very short compared to other coffee brewing methods. The extracted coffee drains through an opening in the bottom of the filter and is collected in a cup for consumption. The pressure differential in the filter is directly related to the grind of the coffee beans and the degree of their compaction.

The quality of the extracted coffee is a function of the following: The freshness and quality of the coffee beans; the fineness of the grind; the volume of ground coffee beans; the compaction of the ground coffee beans; extraction time; the volume of water; the temperature of the water; and the extraction pressure. The degree of compaction of the ground coffee beans and thus the resulting extraction pressure are controlled by the espresso machine operator so operator skill plays an important part in the quality of the coffee produced.

A discussion of the contemporary espresso coffee and its preparation is contained in the Jan. 1989 *Tea & Coffee Trade Journal* article entitled "Espresso: a jewel of flavor" by Sturdivant, pages 30-34. In France and Italy, where espresso coffee has been popular for years, there are many skilled espresso machine operators. The chances of obtaining a high quality of espresso coffee from such operators are above average. In other countries where espresso coffee is growing in popularity, there is a scarcity of skilled operators and the resultant quality of espresso coffee suffers. Thus there is a need for espresso coffee extraction processes and machines that do not rely on operator skill to produce high quality espresso coffee.

U.S. Pat Nos. 4,136,202 and 4,806,375 by Favre relate to sealed cartridges or capsules containing a substance for making a beverage such as espresso coffee. These containers include a filter as part of the floor thereof. An outlet opening is created by pressure induced failure of the capsule exterior. In 4,136,202, this is obtained through rupture of a C-shaped scoring in a lower baffle whereas a plastic seam is caused to fail in 4,806,375.

In either case, the espresso coffee making function is performed exactly as in the prior art once the cartridge or capsule security is broken. This means that an espresso machine operator using the Favre type of containers is denied the opportunity to control the compaction of the ground coffee. Worse, the compaction of the coffee within the containers is subject to disturbance in normal handling prior to placement in a machine. In addition, the operator can only use coffee supplied in the containers, not any coffee.

It is desirable to eliminate the variability in extraction quality based on extraction pressures which is dependent upon operator experience and skill.

SUMMARY OF THE INVENTION

In view of the foregoing, it is an object of this invention to provide an improved espresso coffee extraction process in which the extraction pressure is precisely regulated by the espresso machine and is not a function of operator skill.

It is a further object of this invention to provide an improved espresso coffee extraction process in which the pressure for coffee extraction is kept constant throughout the ground coffee beans resulting in optimum extraction from all the ground coffee beans.

It is a further object of this invention to provide an improved espresso coffee extraction process in which a relatively wide range of coffee bean grind sizes is accommodated.

These and other objects of the invention are accomplished in accordance with the principles of the invention by use of an espresso coffee extraction process in which the extraction pressure necessary to produce high quality espresso coffee is not dependent on the compaction of the ground coffee beans by the operator. The pressure is controlled by a pressure valve on the outflow of the filter which holds the ground coffee beans.

As in the conventional espresso coffee extraction process, the volume of ground coffee and the volume of water forced through the ground coffee are volumetrically measured. Unlike the conventional process, however, the fineness of the coffee grind used in the improved process can range from a fine espresso grind to a coarser or finer coffee grind. In addition, in the improved process, manual compaction of the ground coffee beans is not needed.

A measured volume of water, either hot or cold, is forced through the ground coffee beans as in a conventional process. In the conventional process the pressure required to extract the coffee from the ground beans is created by the compacted coffee grinds which restricts the flow of water through the coffee grinds until the water pressure is high enough to penetrate the barrier created by the compacted ground coffee. The pressure varies throughout the ground coffee beans starting at the highest level on the side of the water inflow to the ground coffee and decreasing to zero pressure at the water outflow point.

In the improved process, however, the requisite pressure results from a mechanical valve on the outflow of the filter. A measured volume of water is introduced into the filter which holds the ground coffee beans. When the pressure reaches the optimum pressure for extraction, the valve regulator begins to open allowing the water to pass through the ground coffee beans. The pressure throughout all the ground coffee beans is the same — there is no pressure gradient. Because the optimum extraction pressure extends to all of the ground coffee beans, less ground coffee beans are required to make espresso coffee than conventional methods.

Thus the invention employs a valve apparatus associated with a brewing chamber assembly including a regulator, downstream of the ground coffee, which precisely controls extraction pressure regardless of coffee grind size or coffee compaction, or incoming water supply pressure. The operator simply places ground coffee in the brewing chamber and attaches the regulator assembly to the espresso machine. Water is introduced into the brewing chamber as in prior espresso machines, but rather than relying on the compaction of the ground coffee to create the pressure barrier, the valve on the downstream side of the brewing chamber creates the pressure barrier and only opens to allow coffee extraction once a predetermined pressure is reached. Thus, the ideal pressure differential is maintained between the inlet and outlet of the brewing chamber.

The process for extracting espresso coffee from ground coffee beans in accordance with this invention starts with the step of placing ground coffee beans in a filter basket. Water is then moved through the ground coffee beans in the filter basket. Finally, the pressure of the water is controlled so the water surrounding the ground coffee beans between the water inlet and the downstream outlet for the water after the water has passed through the ground coffee beans is such that the pressure differential thereacross remains constant regardless of variations in the inlet and outlet pressures.

Apparatus of this invention for extracting espresso coffee from ground coffee beans includes a source of pressurized liquid along with a pressure regulating valve. The valve inlet receives the liquid and an outlet discharges it. The valve remains closed to liquid flow therethrough until a predetermined pressure is reached between the inlet and outlet and thereafter the valve begins to open to allow liquid to flow therethrough while maintaining a constant pressure between the inlet and outlet. A container receives the ground coffee beans and includes a filter element for establishing a closed path for flow of the liquid from the source through the beans and filter into the valve inlet.

The present invention is an apparatus for cooperatively interfacing with the source of pressurized fluid for an espresso coffee machine. It employs a chamber for receiving ground coffee beans and including an inlet for receiving pressurized fluid from the espresso machine source and an outlet for allowing fluid flow through the chamber. A regulator valve has an input (coupled to the chamber outlet) and an output. This regulator valve responds to fluidic pressure at its input by blocking fluid passage between that input and its output until a predetermined pressure is reached. Thereafter it allows fluid flow between its input and output with a flow magnitude adjusted for maintaining constant pressure of the fluid at its input.

The brewing chamber filter prevents the ground coffee beans from passing through the chamber outlet with the fluid. In one configuration, the regulator valve includes a piston element movably mounted between a fluid flow blocking position relative to the filter output and positions where the amount of fluid flow from the filter is proportioned to the distance of the piston element from the filter.

The piston element is normally biased towards the filter with a force requiring pressure on the piston element from the fluid in the chamber at a level equal to or greater than the aforementioned predetermined pressure. The biasing of the piston allows fluid flow from the chamber outlet in quantities proportioned to the amount of flow supplied so long as it is supplied while the pressure on the chamber fluid exceeds the predetermined pressure.

The regulator valve can employ a plate having at least one fluid passageway therethrough mounted in intervening relation to the piston element and filter. By use of a central opening through the piston element, the piston element can move so as to block its central opening by engaging a portion of the plate displaced from the fluid passageways when the pressure on the chamber fluid is less than the predetermined pressure.

An advantageous feature of the present invention is that it can utilize a housing for retaining the filter and regulator valve as a unitary assembly. This permits manual attachment and removal of the chamber with respect to an espresso coffee machine with the chamber inlet in fluidic communication with the espresso machine pressurized fluid source.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
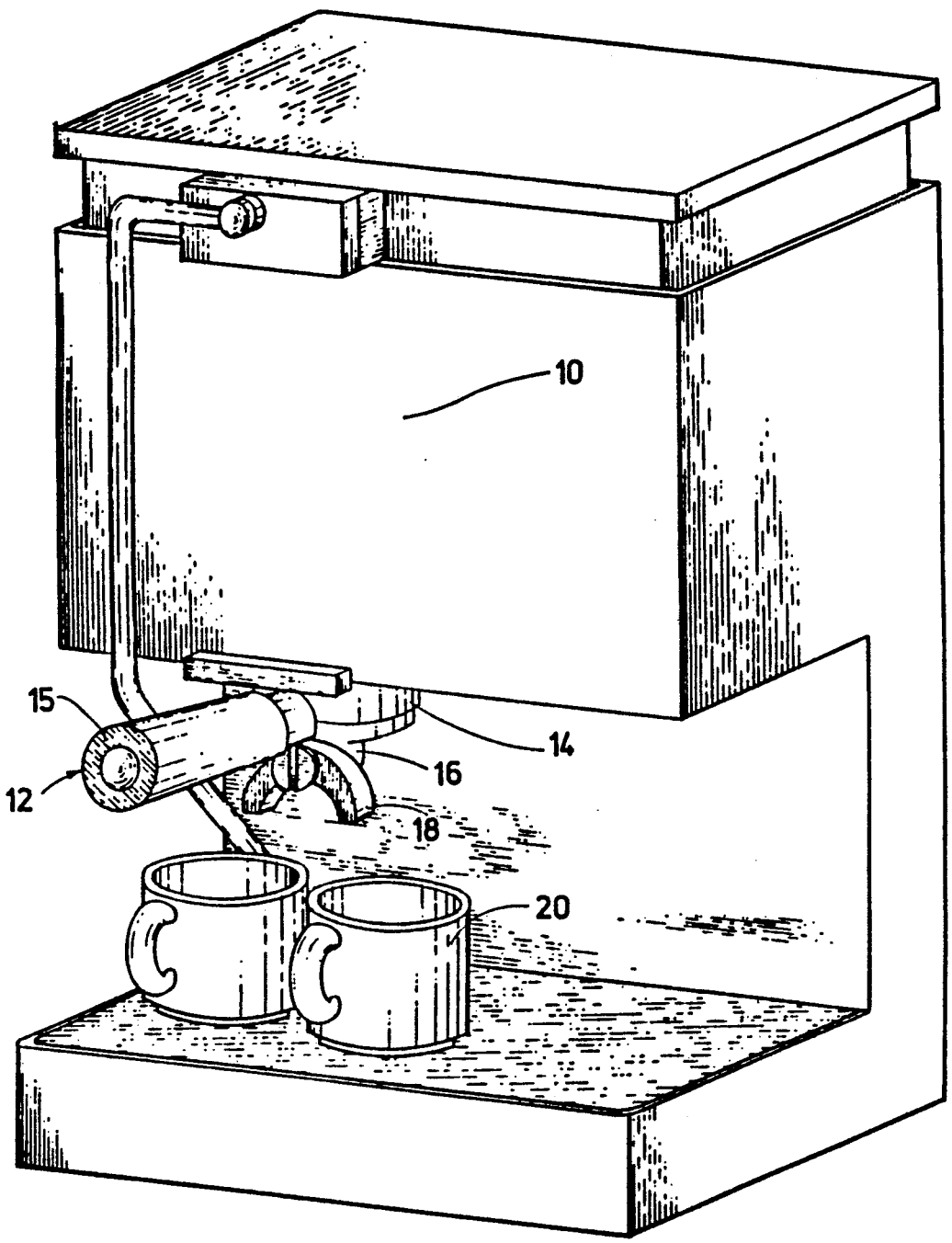
FIG. 1 is an illustration of an espresso machine improved in accordance with this invention.
Figure 2:
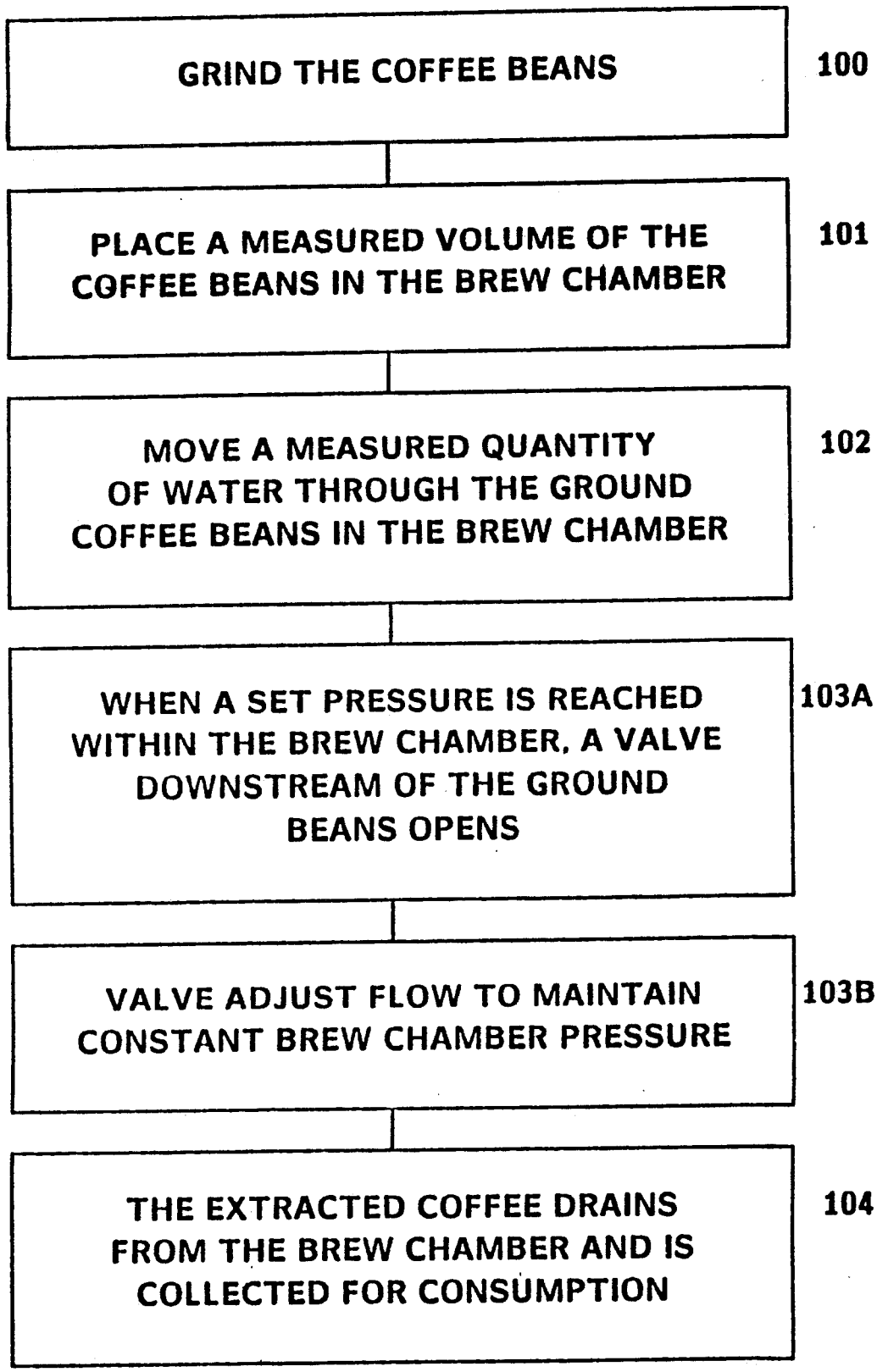
FIG. 2 is a flow chart of the improved espresso coffee extraction process.

Referring now to the drawings, there is shown in FIG. 1 a partial view of an espresso coffee machine 10 showing an assembly 12 which includes a ground coffee bean filter 14, a pressure regulation valve mechanism 16, and a handle 15 for manually removing and attaching assembly 12 to machine 10. The final espresso coffee product extracted from assembly 12 is dispensed from outflow spout 18 for collection in cups 20. FIG. 2 is a flow chart of the steps in the process of extracting espresso coffee which includes the improved process. The following discussion references both figures.

At step 100 coffee beans are ground by any suitable contemporary device or technique. The grind accommodated in the improved process includes a range from grind sizes finer than conventional espresso coffee grinds to the grind sizes coarser than conventional espresso coffee grinds. At step 101 a measured volume of the ground coffee beans is placed in the filter 14 of the assembly 12. Unlike conventional espresso extraction processes, the ground coffee does not require compaction in the filter 14.

At step 102 a measured quantity of water is moved through the ground coffee beans in the filter 14. Water pressure builds within the filter until a predetermined pressure level is reached. The particular pressure level is based on the optimum extraction pressure for a given volume and temperature of water.

When the optimum pressure is reached (eg.: in the range of 7 to 12 bars), regulator valve mechanism 16 on the outflow of the filter opens (step 103A) allowing the extracted espresso coffee to begin flowing from the filter 14. As indicated by step 103B, the regulator valve 16 thereafter controls the amount of flow from the filter 14 so that a relatively constant pressure is maintained within the brewing chamber and across the filter 14. There are a variety of commercially available pressure regulating valves available which are suitable for valve 16, such as a Speedaire Model No. 2X947A, Dayton Electric Manufacturing Co., Chicago, IL. 66648. The machine outflow spout 18 is downstream of the ground coffee beans and regulator valve 16. At step 104 the extracted espresso coffee is distributed for collection in either or both of cups 20.

In the improved process of extraction pursuant to this invention, extraction pressure is controlled by the valve mechanism 16 and not by a variable such as the degree of compaction of the ground coffee beans as in a conventional process. The brewing chamber and regulator assembly 12 as shown in FIG. 1 has an exterior appearance which is superficially similar to the filter structure of a traditional espresso machine utilizing a handle and housing.

Figure 3:
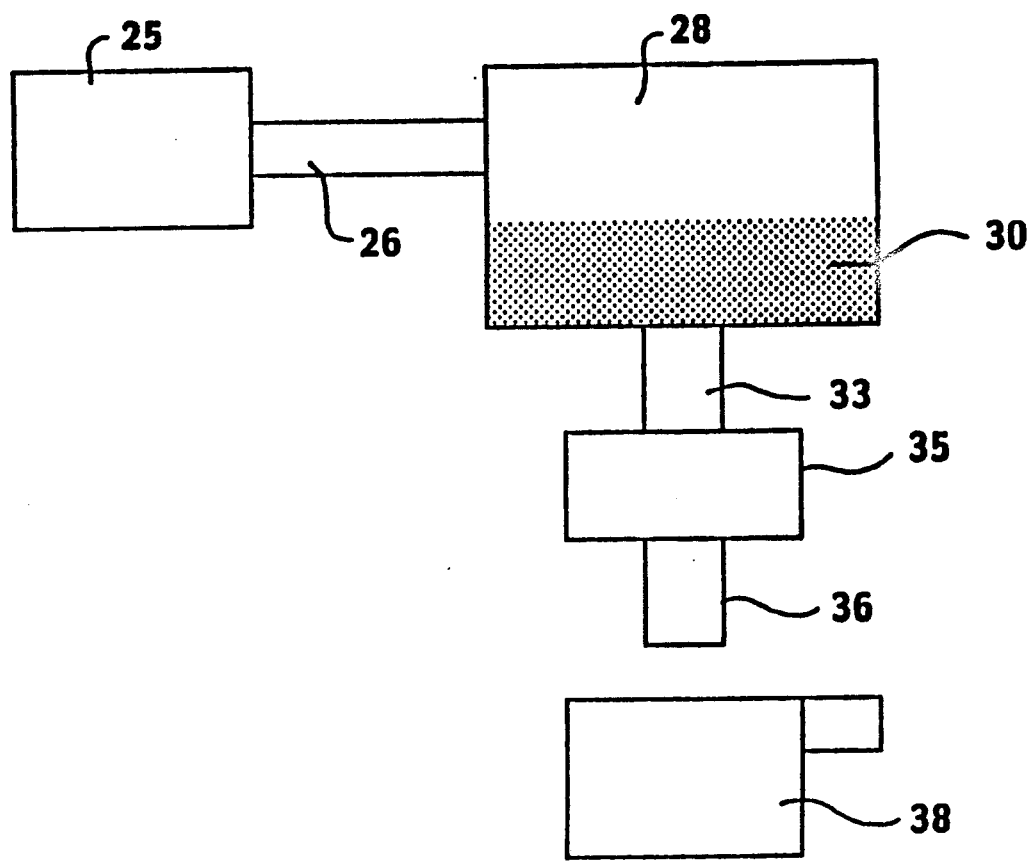
FIG. 3 is a schematic diagram of the liquid flow within an espresso machine in accordance with this invention.

FIG. 3 schematically depicts the fluid flow pattern through an espresso coffee machine modified in accordance with the present invention. A boiler or other source 25 introduces heated water under pressure to brewing chamber 28 via inlet 26. The water temperature for hot espresso extraction is typically 86° C. to 92° C. which is comparable to the water temperature used in prior art espresso machines. The ground coffee 30 is placed in the lower basket of chamber 28. A filter (not shown in FIG. 3) associated with the floor 32 of chamber 28 separates coffee 30 from outlet 33. The filter generally has a porosity equivalent to contemporary espresso machine filters.

Regulator valve 35 is coupled in intervening relation between outlet 33 of chamber 28 and exhaust pipe 36. Whenever the pressure inside chamber 28 and thus at chamber outlet 33 exceeds a predetermined level, regulator valve 35 opens and allows the fluid flow from outlet 33 into pipe 36 to commence. Valve 35 thereafter adjusts the volume of fluid flow so as to maintain the pressure at outlet 33 and thus within chamber 28 relatively constant regardless of changes in the flow through chamber 28 for whatever reason. Ultimately the extracted espresso coffee is collected in cup 38.

Figure 4:
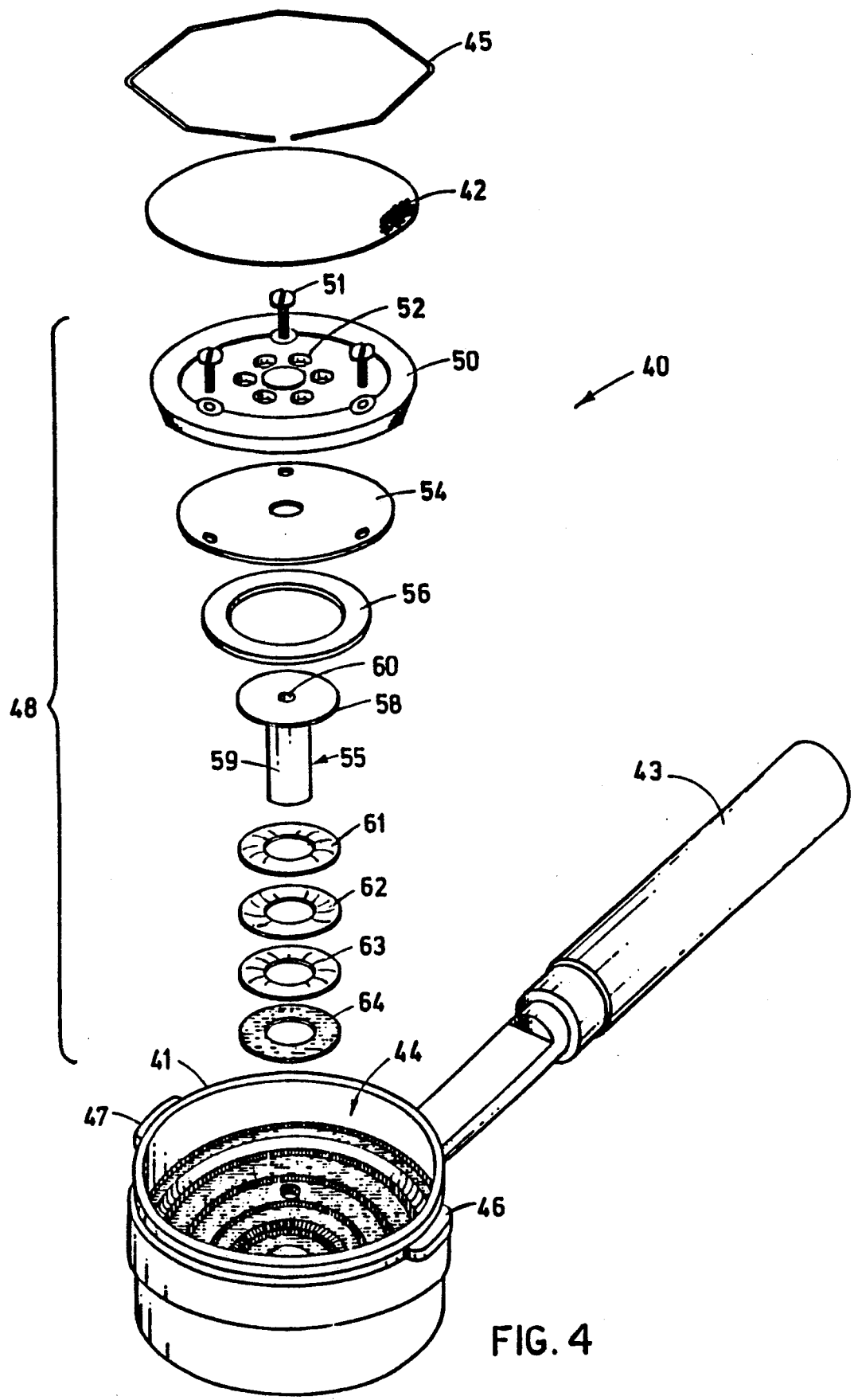
FIG. 4 is an exploded perspective view of an embodiment incorporating a brewing chamber and regulator assembly in a common housing.
Figure 5:
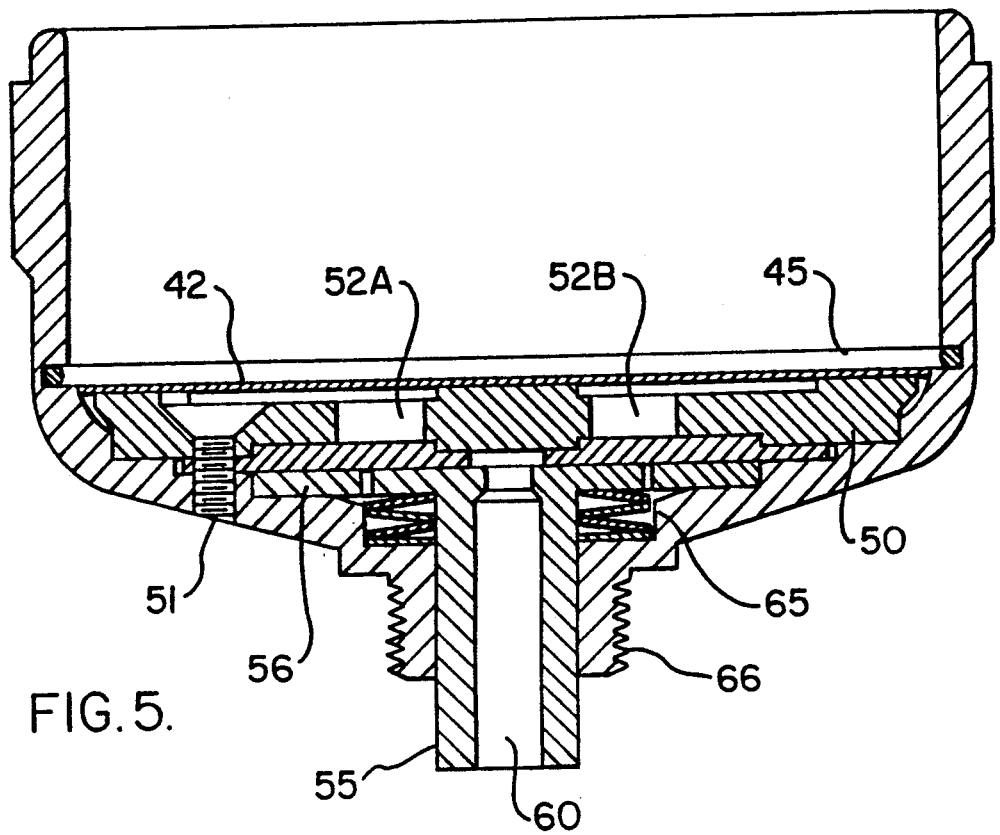
FIG. 5 is a sectioned view of the filter and regulator assembly of FIG. 4 with the valve in the closed position.
Figure 6:
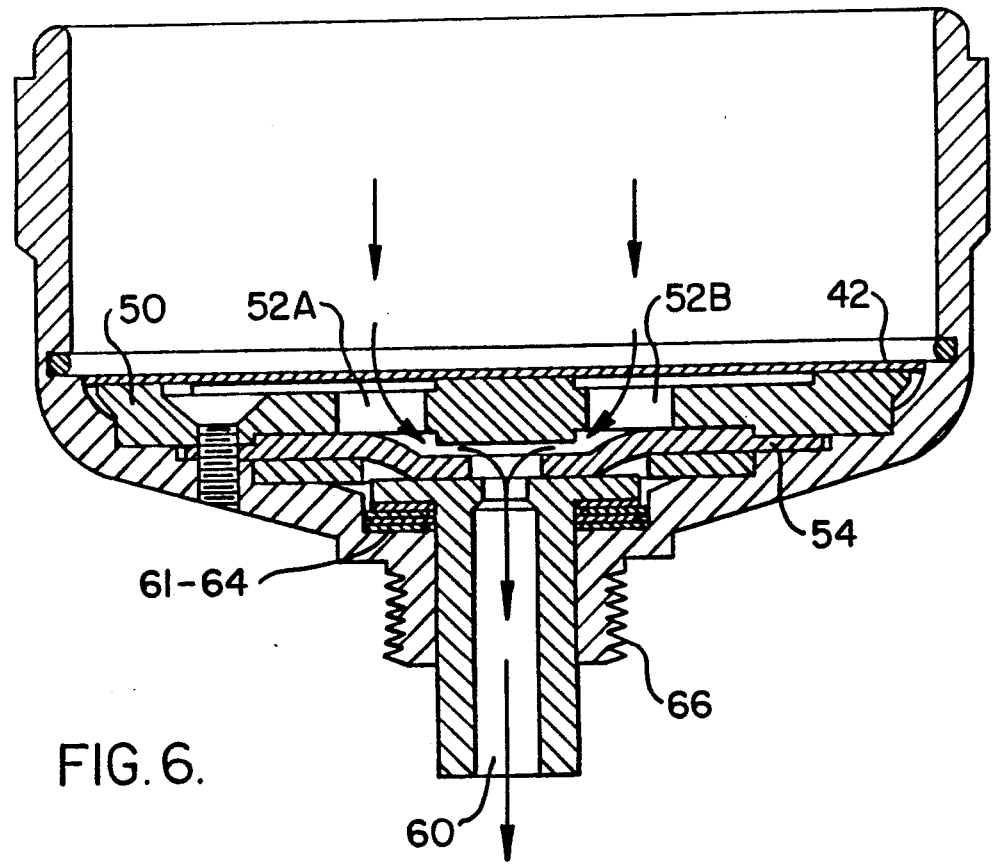
FIG. 6 is a sectioned view of the FIG. 4 filter and regulator assembly with the valve in the fully open position.

An embodiment of a preferred form of a filter and regulator valve assembly 40 in accordance with this invention is shown in FIG. 4 with its operation illustrated in FIGS. 5 and 6. A flat metal strainer screen 42 is positioned in the bottom portion of the brewing chamber 44 within the housing 41 and is held in place by a flat screen lock ring 45. Ground coffee beans placed in the brewing chamber 44, sit on top of the flat metal strainer screen 42 and the screen prevents ground coffee from entering the valve mechanism 48.

A valve ring 50 is positioned on the bottom side of the flat metal strainer screen 42. This part is held to the housing 41 by means of three screws such as screw 51. It has several flow holes 52 (shown as 52A and 52B in FIGS. 5 and 6) through which liquid coffee flows after extraction. The valve ring 50 prevents deflection of the flat metal strainer screen 42.

A pressure gasket 54 is located between the top of the head 58 of piston 55 and the bottom side of the valve ring 50. Gasket 54 seals the valve ring 50 flow holes 52 when the piston 55 is pressed against the bottom of the valve ring 50. A piston retainer ring 56 encircles the head 58 of the piston 55 and provides a guide in which piston 55 moves.

Round spring washers 61-63 shown in the bell-type configuration sit atop flat washer 64. Washers 61-64 surround and locate piston 55 within annular recess 65 (note FIG. 5) which forms a channel to seat washers 61-64 in housing 41. Springs 61-63 force the top surface of the head 58 of piston 55 against the bottom side of the pressure gasket 54. A force is exerted onto the top of piston head 58 when water under pressure is introduced into the brewing chamber 44. The spring washers 61-63 compress allowing displacement of piston 55 in a downward direction.

The piston head 58 has a greater circumference than the stem 59 which has a hole 60 through its center and extending along its length, through which liquid can flow. That is, flow channel 60 is the channel through the piston which supports coaxial liquid flow once the piston is displaced in a downward direction.

Ground coffee is placed in brewing chamber 44 on top of the flat metal strainer screen 42, but the user need not compact the coffee grounds. The regulator assembly 40 is attached to the espresso machine. Water, under pressure, is introduced into the brewing chamber 44. The valve mechanism 48 of the invention is initially in the shut position as is best seen in FIG. 5. Pressure builds within the brewing chamber 44 until a predetermined pressure is reached. For the extraction of espresso coffee the ideal pressure is approximately 125 psi.

When the predetermined pressure is reached, the spring washers 61-63 begin to compress allowing the piston 55 to displace in a downward direction. By using constant force springs, pressure will remain constant independent of flow. The pressure gasket 54 effectively transfers the pressure present on the fluid in outlet ports 52 to the upper face of head 58 of piston 55. Piston head 58 moves downwardly to increase liquid flow from chamber 44 thereby reducing the pressure in chamber 44 until equilibrium is reached with the force of springs 61-63. Further, gasket 54 deflects with movement of the piston head 58 allowing liquid to flow through the outlet formed by valve ring flow holes 52 into coaxial channel 60.

The liquid continues to flow through flow channel 60 which extends coaxially through the interior of piston 55 and exits out the bottom of piston 55. Valve 48 thereafter functions as a regulator valve. That is, the quantity of flow through valve 48 is a function of the amount of compression of spring washers 61-63 which, in turn, is a function of the pressure on the heated water present in brewing chamber 44.

When water flow to the brewing chamber 44 ceases, the pressure within chamber 44 decreases eventually dropping below the predetermined valve pressure. At this point the spring washers 61-63 decompress forcing the piston 55 and pressure gasket 54 against the bottom side of the valve ring 50. This action seals the valve ring flow holes 52 and stops the flow of liquid by returning the structure to the FIG. 5 configuration.

The predetermined pressure under which the valve 48 opens is based on the ideal extraction pressure needed for brewing a particular kind of coffee. Since the valve 48 only remains open when this pressure is maintained, extraction or brewing only occurs when the proper pressure exists within the brewing chamber 44.

Note that housing 41 in FIG. 4 has a handle 43 attached thereto and camming ears 46 and 47 on either side of its upper exterior surface. This accommodates attachment to mating structure on the espresso machine with a tight seal by inserting the camming ears into a slot and turning the assembly horizontally as is conventional. The threaded collar 66 (note FIGS. 5 and 6) is arranged to secure an appropriate output pipe for delivering the fluid to receiving cups, containers, or the like.

Figure 7:
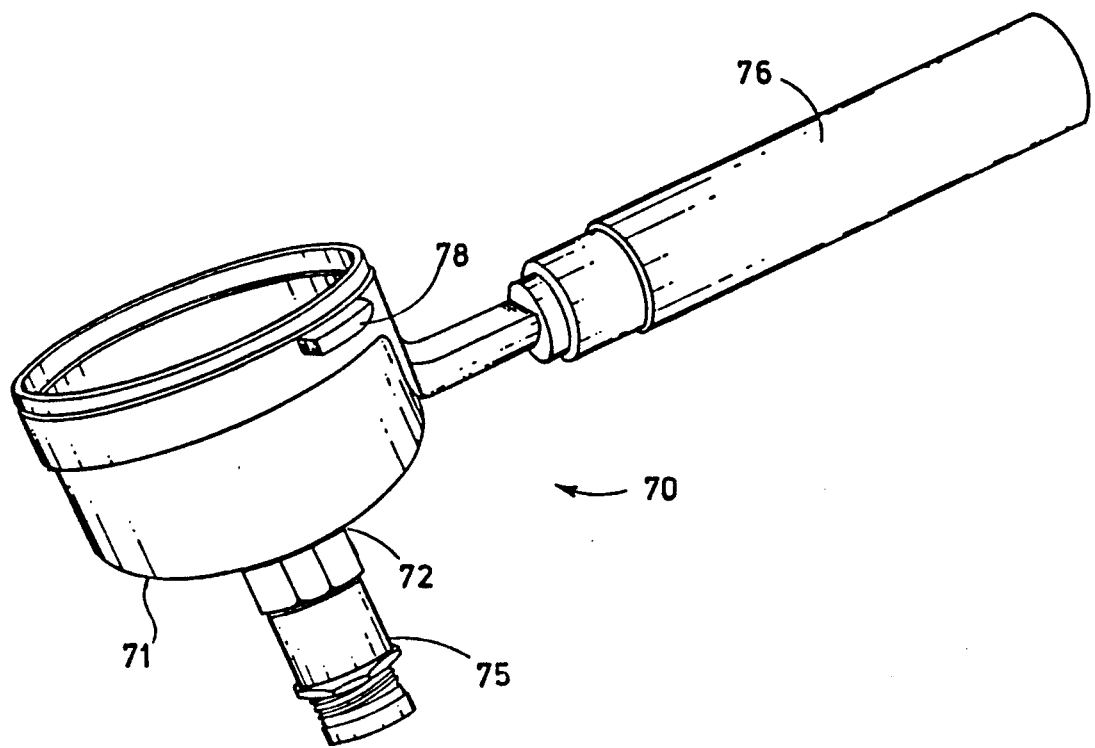
FIG. 7 is an isometric view of another embodiment of the present invention.

FIG. 7 illustrates another embodiment of this invention employing a filter and regulator assembly 70. Housing 71 includes a brewing chamber 72 with a filter screen associated with its bottom outlet 73. In this configuration, the regulator valve 75 is attached to outlet 73. Commercially available valves such as the Speedaire Model No. 2X947A from Electric Manufacturing of Chicago, IL are suitable for valve 75. The outlet of valve 75 is attachable to a spout for dispensing to a receptacle. Handle 76 and camming ears such as 78 accommodate sealed attachment of assembly 70 to an espresso machine similar to that described above for FIG. 4.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for extracting espresso coffee from ground coffee beans comprising:
   a source of pressurized liquid;
   a normally closed pressure regulating valve having an inlet for receiving said liquid and an outlet for discharging said liquid, said valve remaining closed to liquid flow therethrough until a predetermined pressure is reached between said inlet and said outlet, said valve thereafter opening to allow flow of said liquid from said inlet to said outlet, and said valve thereafter maintaining a constant pressure between said inlet and said outlet; and
   means for receiving a container having said ground coffee beans and a filter for establishing a closed path for flow of said liquid from said source through said beans and said filter into said valve inlet when said valve is open.

2. Apparatus for cooperatively interfacing with the source of pressurized fluid for an espresso coffee machine comprising:
   means having a chamber for receiving ground coffee beans and including an inlet for receiving pressurized fluid from the espresso machine source and an outlet for allowing fluid flow from said chamber, and
   normally closed regulator valve means having an input coupled to said chamber outlet and an output, said regulator valve means responding to fluidic pressure at said valve input by blocking fluid passage between said valve input and said valve output until a predetermined pressure is reached and thereafter allowing fluid flow between said valve input and said valve output with a flow magnitude for maintaining constant pressure of the fluid at said valve input.

3. Apparatus in accordance with claim 2 wherein said chamber includes filter means for preventing the ground coffee beans from passing through said chamber outlet with said fluid flow.

4. Apparatus in accordance with claim 3 wherein said regulator valve means includes a piston element movably mounted between a fluid flow blocking position relative to said chamber outlet and positions where the amount of fluid flow from said chamber outlet is proportioned to the distance of said piston element from said chamber outlet, and means biasing said piston element towards said chamber outlet with a force requiring pressure on said piston element from the fluid in said chamber at a level equal to or greater than said predetermined pressure.

5. Apparatus in accordance with claim 4 wherein said biasing means allows fluid flow from said chamber outlet in quantities proportioned to the amount by which the pressure of said chamber fluid exceeds said predetermined pressure 6. Apparatus in accordance with claim 5 which includes a plate having at least one fluid passageway therethrough and mounted in intervening relation to said piston element and said filter means, said piston element having a central opening therethrough, said piston element being movably mounted for blocking said piston element central opening by engaging a portion of said plate displaced from said fluid passageway when the pressure on said chamber fluid is less than said predetermined pressure 7. Apparatus in accordance with claim 2 which includes housing means for manually attaching and removing said chamber to the espresso coffee machine with said chamber inlet in fluidic communication with the espresso machine pressurized fluid source.

8. Apparatus in accordance with claim 2 which includes a housing retaining said chamber and said regulator valve means in operative relation to one another as a unit, said housing including means for removably attaching said unit to the espresso coffee machine with said chamber inlet in fluidic communication with the source of pressurized fluid.

9. Apparatus in accordance with claim 8 wherein said housing includes means for manually attaching and removing said unit from the espresso coffee machine.

10. Apparatus for regulating the flow of fluid through the chamber of an espresso coffee machine, said chamber including a chamber inlet, a chamber outlet, and an arrangement for retaining ground coffee beans therein with a filter for allowing pressurized fluid to pass to the chamber outlet while blocking passage of the ground coffee beans comprising:

fluid input means coupled to the chamber outlet, and normally closed pressure responsive means responsive to the pressure of the fluid at said input means for blocking fluid passage therethrough until the fluid pressure at said input means reached a predetermined magnitude and for responding to fluid pressure at said input means greater than said predetermined magnitude by allowing fluid flow therethrough of a magnitude for thereafter maintaining the fluid pressure at said input means substantially constant.

11. Apparatus in accordance with claim 10 wherein said pressure responsive means includes a plate having at least one solid portion and a plurality of passageways therethrough for interfacing with said filter, a piston having a head, an opening in said head, and a fluid flow channel through said piston from said opening in said head, a housing mounting said piston for movement between a first position wherein said piston head opening is closed by abutment with said plate solid portion and a second position wherein said piston head opening is open and displaced from said plate solid portion for allowing fluid to flow from said plate passageways into said piston fluid flow channel, and means biasing said piston towards said plate solid portion with a force corresponding to said predetermined pressure magnitude.

12. Apparatus in accordance with claim 11 wherein said biasing means is a spring positioned to cooperate between said housing and said piston head for forcing said piston head against said plate solid portion.

13. Apparatus in accordance with claim 12 which includes a flexible gasket having an opening therethrough with said housing including means mounting said gasket between said plate and said piston head with said gasket opening in alignment with said piston head opening for sealing said plate passageways while transmitting the fluid pressure on said plate from the chamber to said piston head.

14. Apparatus for extracting espresso coffee from ground coffee beans comprising means having a chamber for receiving the ground coffee beans and having an inlet and an outlet for accommodating fluid flow through said chamber, means for introducing pressurized fluid in said chamber through said inlet thereof, and normally closed regulator valve means coupled to said chamber outlet for allowing fluid flow from said chamber outlet only after the pressure of said pressurized fluid equals a predetermined pressure and for thereafter controlling the amount of flow of said fluid through said regulator valve means so as to maintain a substantially constant pressure on said fluid between said chamber inlet and outlet.

15. Apparatus in accordance with claim 14 for use with an espresso coffee machine which has a source of pressurized fluid, said apparatus further including housing means for retaining said chamber and said regulator valve means in fluidic communication relative to one another, said housing means further including means for manually attaching said chamber inlet in sealed relation to the pressurized fluid source.

16. Apparatus in accordance with claim 15 wherein said housing means retains said chamber and said regulator valve means in a common shell.

17. Apparatus in accordance with claim 15 wherein said housing means includes means for removably retaining said regulator valve relative to said chamber.

* * * * *